(12) United States Patent
Nieberding

(10) Patent No.: US 6,499,458 B1
(45) Date of Patent: Dec. 31, 2002

(54) METHOD FOR OPERATING A FOUR-STROKE RECIPROCATING INTERNAL COMBUSTION ENGINE

(75) Inventor: Rolf-Gunther Nieberding, München (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/646,452

(22) PCT Filed: Feb. 23, 1999

(86) PCT No.: PCT/EP99/01145

§ 371 (c)(1),
(2), (4) Date: Feb. 26, 2001

(87) PCT Pub. No.: WO99/47797

PCT Pub. Date: Sep. 23, 1999

(30) Foreign Application Priority Data

Mar. 13, 1998 (DE) .......................... 198 10 935

(51) Int. Cl.[7] ................ F02B 1/12; F02B 7/02
(52) U.S. Cl. .............. 123/299; 123/294; 123/568.14
(58) Field of Search ............... 123/27 R, 294, 123/299, 300, 305, 568.14

(56) References Cited

U.S. PATENT DOCUMENTS 6,105,550 A * 8/2000 Nieberding .................. 123/294
6,192,858 B1 * 2/2001 Nieberding ........ 123/568.14 X

FOREIGN PATENT DOCUMENTS

| DE | 19519663 A1 | 5/1995 |
| FR | 1234262 | 10/1960 |
| GB | 439423 | 12/1935 |
| GB | 2277776 A | 11/1994 |
| WO | WO 86/04111 | 7/1986 |

* cited by examiner

Primary Examiner—Tony M. Argenbright
(74) Attorney, Agent, or Firm—Crowell & Moring LLP

(57) ABSTRACT

In a four-stroke reciprocating-piston internal combustion engine, a method is carried out for operating the latter with a homogeneous lean basic mixture of air, fuel and retained exhaust gas and with compression ignition and direct fuel injection into a combustion space. In order to avoid ignition problems during compression ignition and in the case of a low load, in an activation phase, the retained exhaust gas is compressed in the region of the gas-exchange dead center and is subsequently expanded, and, in this phase of the work cycle, activation fuel is injected into the combustion space in order to stabilize main combustion.

10 Claims, 2 Drawing Sheets

METHOD FOR OPERATING A FOUR-STROKE RECIPROCATING INTERNAL COMBUSTION ENGINE

BACKGROUND AND SUMMARY OF THE INVENTION

The invention relates to a method for operating a four-stroke reciprocating-piston internal combustion engine of the generic type.

Reciprocating-piston internal combustion engines afford the possibility, during the compression ignition of homogeneous lean mixtures, of the formation of only small amounts of nitrogen oxides, along with high efficiency, when throttle control and a rich mixture are avoided. Compression ignition functions only with exhaust-gas retention in the case of compression ratios which are customary in engines. At a low engine load and low engine speed, and also when the engine is cold, however, even the rise in temperature due to exhaust-gas retention is not sufficient for the reliable ignition of the fresh charge.

DE-A 195 19 663 describes a method for operating an internal combustion engine with compression ignition. Here, in a first step, a homogeneous and lean air/fuel mixture generated as a result of external mixture formation is compressed to near the ignition limit. In a second step, an additional quantity of the same fuel is finely atomized and, with wall contact being avoided, is injected into the combustion space. The fuel injected late forms a mixture cloud which ignites, since, because of the higher fuel content, its ignition limit is below the compression temperature reached in the first step. These conditions apply to a higher engine load and higher engine speed and to an engine which is running hot.

The object on which the invention is based is to provide a method of the generic type which allows reliable ignition and low-consumption and low-pollutant combustion even at a low load and a low engine speed and when the engine is running cold.

By virtue of the method according to the invention, the reciprocating-piston internal combustion engine ignites the mixture of air and fuel by virtue of the rise in temperature of the mixture. The rise in temperature of the fresh mixture is brought about by mixing with retained exhaust gas from the previous cycle and due to the subsequent geometric compression of the closed-off maximum initial volume to a remaining residual volume. In the compressed volume, a temperature is established which brings the mixture to ignition. The combustion process which follows the compression ignition of the homogeneous lean mixture is a process which is self-maintained maintained due to the energy released.

The exhaust gas occurs in the combustion space as a result of the combustion of the fresh mixture. The energy released during combustion is dissipated as a result of expansion up to the maximum combustion-space volume. Subsequently, an outlet member is opened and exhaust gas is expelled as a result of the reduction in the combustion-space volume. While the expulsion operation is taking place, during the reduction in the combustion-space volume, the outlet member closes and retains the exhaust gas. The latter is compressed to the minimum combustion-space volume. The retained exhaust gas has occurred during combustion with air excess. The combustion phase is in the region of maximum geometric compression between the compression phase and the expansion phase. The number of thermodynamic phases of the four-stroke engine therefore amounts to five phases.

In order to broaden the operating range of an engine with the compression ignition of homogeneous lean mixtures, a sixth thermodynamic phase, the activation phase, is interposed. During the compression of the retained exhaust gas, an activation fuel quantity is injected into the air/exhaust-gas mixture and is distributed as homogeneously as possible, together with the remaining air fractions, in the combustion space. Thermal energy is supplied to the fuel by conduction and compression, so that a chemical reaction and/or ignition is initiated. As a result of complete combustion of the activation fuel, the thermal energy of the exhaust gas which has remained is increased in order to ensure ignition in the next cycle. If combustion is incomplete, at least the chemical activity of the retained exhaust gas quantity is increased (the formation of radicals), without the temperature being raised appreciably at the same time. In both cases, and in a situation where there is a mixture of these, it is possible to speak of activation. A greater fresh-charge mass can be ignited by means of a smaller mass of the retained exhaust gas due to the activation of the latter.

In the case of combustion during exhaust-gas compression, there is a rise in the state of pressure and temperature of the retained exhaust gas in the combustion space. This type of activation is also referred to cascadic combustion, since combustion takes place over two cycles. This has to be taken into account in a later inlet trigger time, in order to ensure a negative pressure difference of the inlet valve due to a longer expansion of the activated exhaust gas. There is no provision for an accumulation of exhaust gas or for pushing the charge back into the suction pipe, since the exhaust-gas quantity necessary for initiating a reaction loses its specific enthalpy due to flow movements and mixing movements.

At low engine speeds, that is to say with high heat losses at the wall, the aim is to achieve maximum activation of the exhaust gas. There is the risk, in this case, that, during exhaust-gas compression, complete combustion will raise the pressure level in the combustion space in such a way that the pressure difference between the surroundings and the combustion space is subsequently not sufficient to suck in a sufficient quantity of fresh gas in the time which has remained when the inlet valves are open. In order to control the pressure and temperature of the retained exhaust gas in the combustion space, the injection point of the activation fuel is varied. If injection is early, that is to say takes place even during the reduction in the combustion-space volume, the temperature of the mixture is increased due to compression, with the result that a reaction is initiated, along with subsequent combustion. If injection of the activation fuel takes place in the region of the minimum combustion-space volume, the increase in this volume delays chemical activity (the formation of radicals), without a pronounced temperature rise being capable of being established in the exhaust gas as a result of self-maintaining reactivity.

The evaporation energy of the fuel injected late extracts thermal energy from the compressed retained exhaust gas. The evaporation energy may also be used to prevent uncontrolled after-ignition of the incompletely burnt mixture mass during the compression of the retained exhaust gas. The chemical activation of the exhaust gas brings about an early initiation of the main reaction in the subsequent complete compression phase and combustion phase. The ignition point of the fresh charge during main combustion can be controlled by means of the point and quantity of activation injection.

In this way, an incomplete reaction during main combustion can be prevented by means of the control action exerted by a cooling ignition injection of activation fuel. The effects of integral influences due to the transmission of wall heat on combustion can be seen over several cycles. The influence of the transmission of wall heat within a cycle can be compensated for a number of subsequent cycles by means of a controlled action involving the variation in activation. This control for combustion stabilization requires its own control loop.

Incomplete combustion does not increase the emission of exhaust gas from the entire engine system, since the inlet control times are always selected in such a way that only fresh gas is sucked in. A possibly incomplete chemical reaction during exhaust-gas compression or expansion is implemented completely as a result of subsequent compression with a high effective compression ratio and subsequent conversion. Activation is used when cyclic combustion can no longer be maintained in the event of a further increase in the fuel fraction in the fresh mixture or when there is exhaust-gas retention. This is recognized by erratic running or a load drop when the engine is in operation.

The logics in the control of ignition injection attempt to keep the ignition injection quantity minimal with a view to a combustion configuration with optimum consumption. The control limits the maximum injection quantity by means of the signal for air deficiency of the exhaust gas (air/fuel ratio $\leq 1$) from the lambda probe in the exhaust-gas tract.

Effective compression of the residual gas is dependent on the exhaust-gas fraction retained. It is, in most cases, at or below half the geometric compression. On account of the low fuel quantities for activation and of the still relatively high exhaust-gas fraction, during ignition combustions the peak pressures and peak temperatures in the exhaust gas are also so low that nitrogen oxides cannot occur in any appreciable quantity.

BRIEF DESCRIPTION OF THE DRAWINGS

Other features of the invention may be gathered from the further claims and from the following description and also from the drawing which illustrates diagrammatically exemplary embodiments of the invention and in which:

DETAILED DESCRIPTION OF THE DRAWINGS

Figure 1:
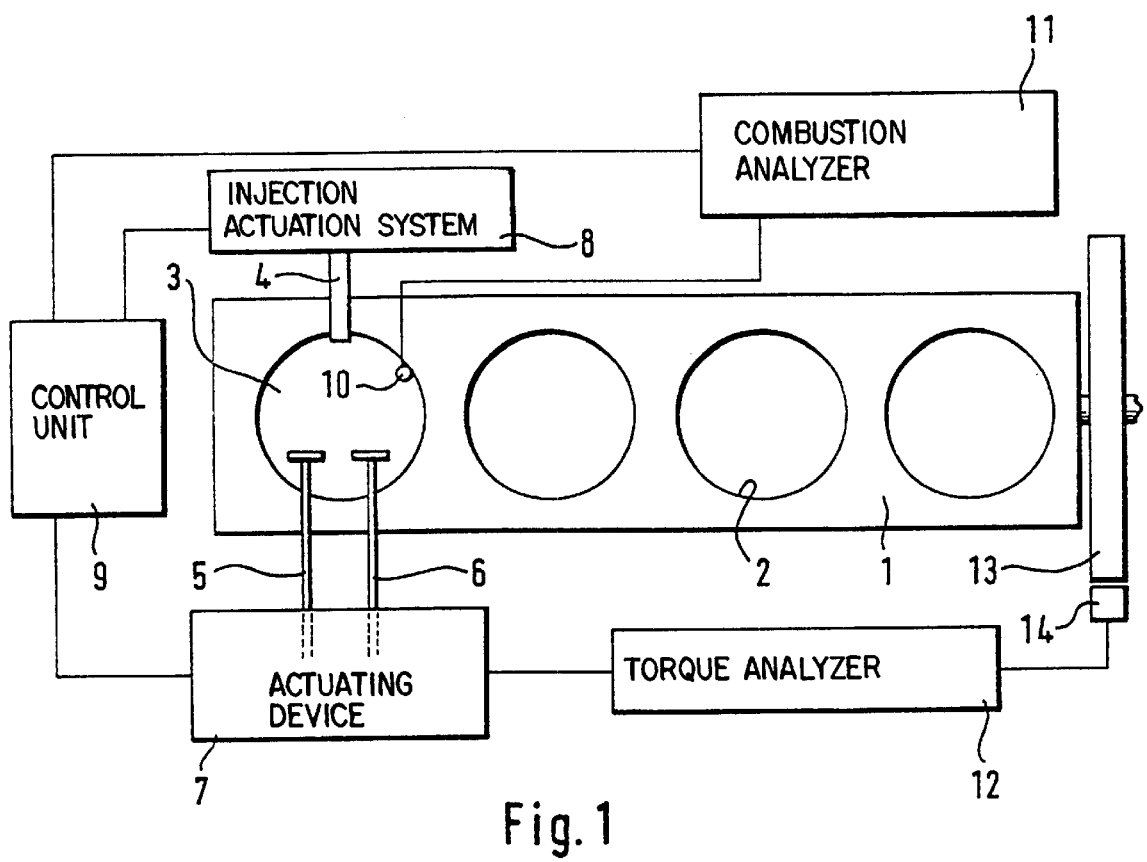
FIG. 1 shows a diagrammatic illustration of a reciprocating-piston internal combustion engine with a control unit for the gas-exchange members and the injection valves and with means for combustion and torque analysis.

The internal combustion engine illustrated diagrammatically in FIG. 1 possesses a cylinder block 1 with four cylinders 2, in which pistons are guided sealingly and which are closed by means of a cylinder head. The cylinder 2, piston and cylinder head enclose a combustion space 3, in which combustion takes place. A fuel injection valve 4, an inlet member 5 and an outlet member 6 are located in the cylinder head for each combustion space 3. The gas-exchange members 5, 6 are opened and closed by an actuating device 7 and the fuel injection valve 4 is opened and closed by an injection actuation system 8. A control unit 9 controls the opening and closing point of the gas-exchange members 5, 6 and of the fuel injection valve 4 continuously.

Combustion is monitored by means of an ionic current probe 10 in a combustion analyser 11 which is connected to the control unit 9. Said analyser is supplemented by a torque analyser 12 which detects the rotational uniformity of the crankshaft on the circumference of a flywheel 13 with the aid of an engine-speed sensor 14 and transmits it to the control unit 9. In addition, a knock sensor may also be used to assess combustion. The ionic-current probe 10, engine-speed sensor 14 and, if appropriate, knock sensor deliver real-time signals on the position and profile of combustion for the control unit 9 which, taking these values into account, brings about the control of the fuel injection valve 4 and the gas-exchange members 5, 6.

Figure 2:
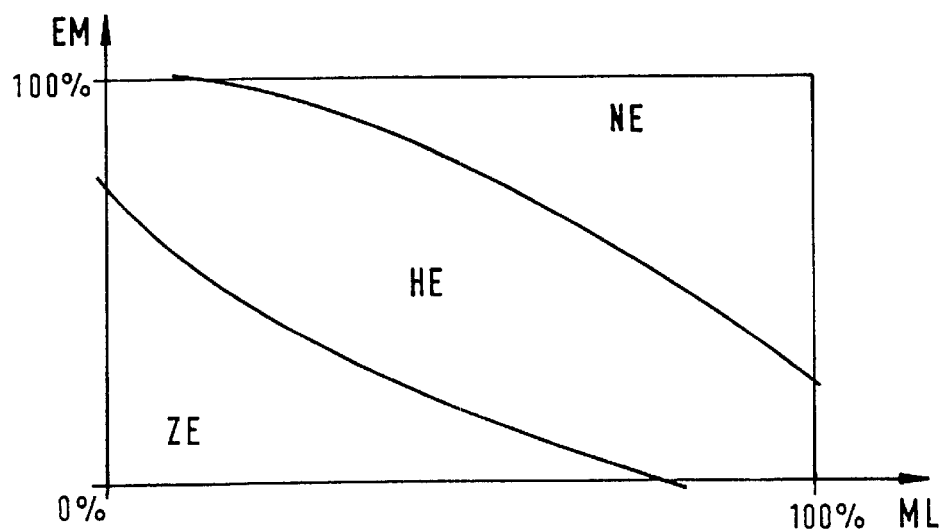
FIG. 2 shows a diagrammatic characteristic map of the distribution of ignition injection, main injection and after-injection against the engine load.

FIG. 2 shows a diagrammatic characteristic map of the entire injection quantities EM against the engine load ML, divided into ignition injection ZE, main injection HE and after-injection NE. Main injection HE takes place in the case of any engine load ML, whereas ignition injection ZE is used only for a low engine load ML and after-injection ME only for a high engine load ML. Details of fuel injection are explained in a subsequent operating description.

Figure 3:
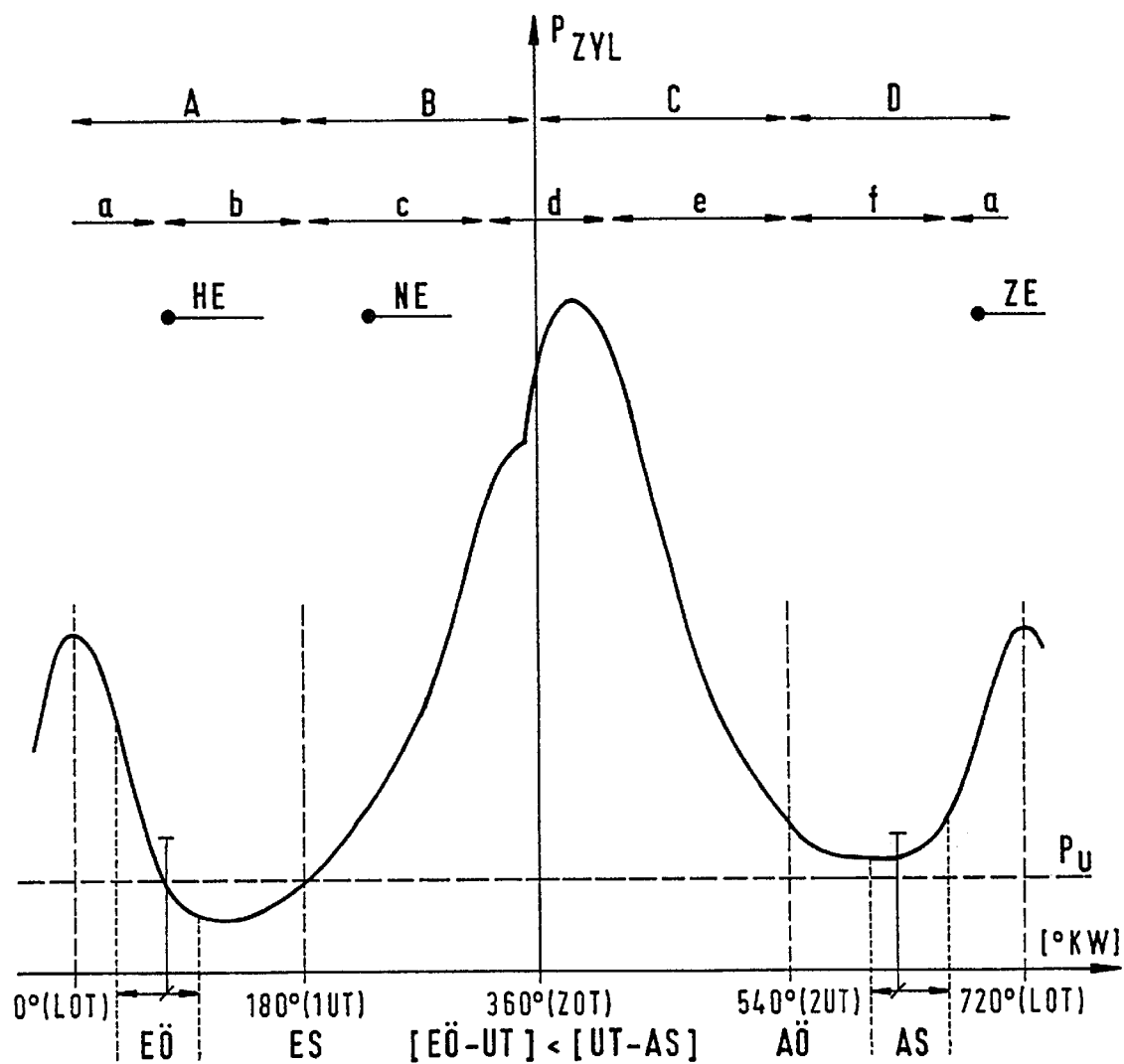
FIG. 3 shows a cylinder-pressure graph with the control times of the gas-exchange members and injection valves.

FIG. 3 illustrates a cylinder-pressure graph extending over a crankshaft angle of more than 720°, with the control times or control-time ranges of the gas-exchange members 5, 6 and fuel injection valves 4 and also with four strokes and six phases of the work cycle. The operation of the method according to the invention will be explained with reference to this cylinder-pressure graph:

In the four-stroke method, one stroke corresponds to one full piston stroke. The first stroke 1T commences at gas-exchange dead centre LOT at a crankshaft angle of 0° and terminates at the first bottom dead centre 1UT at a crankshaft angle of 180°. This is followed by the second stroke 2T which terminates at the ignition dead centre ZOT. The third stroke 3T then commences, which terminates at the second bottom dead centre ZOT at a crankshaft angle of 540°. The subsequent fourth stroke 4T terminates at the gas-exchange dead centre LOT at a crankshaft angle of 720°. The next stroke sequence then commences.

The six phases of the work cycle depend predominantly on the control times of the gas-exchange members 5, 6 and partially overlap from one stroke to the next.

The work cycle commences with an activation phase a, during which exhaust gas retained in the region of the gas-exchange dead centre LOT is compressed and expanded between the outlet closing AS and inlet opening EÖ. In the activation phase A, in the case of a low engine load ML, activation fuel is injected into the retained exhaust gas by means of ignition injection ZE. In the case of a very low engine load ML, this takes place during the compression of the activation phase a. The finely atomized activation fuel evaporates in the hot retained exhaust gas and with the residual oxygen of the retained exhaust gas forms an ignitable mixture. The residual oxygen was yielded by the lean mixture of the previous work cycle. In the region of the gas-exchange dead centre LOT, the ignition of the activation fuel takes place, thus resulting in a rise in temperature and pressure of the retained exhaust gas. The preconditions for reliable ignition of the main injection quantity in the region of ignition dead centre ZOT are consequently afforded, even in the case of a low engine load ML and when the engine is running cold.

Since there are only small quantities of activation fuel, which, moreover, burn the atmosphere containing a high proportion of exhaust gas, virtually no nitrogen oxide is formed at the same time. The rise in temperature of the retained exhaust gas makes it possible to reduce the quantity of the latter in favour of a greater quantity of fresh gas.

With an increase in engine load ML and engine temperature, ignition injection ZE is retarded. In the case of ignition injection at the gas-exchange dead centre LOT or thereafter, there is no ignition, but, instead a formation of radicals and the chemical activation of the activation fuel, leading to the desired improvement in the ignition of the main fuel quantity. The partly burnt or activated activation fuel is burnt completely during main combustion, thus preventing the emission of hydrocarbons.

Above a specific engine load ML and when the engine is running hot, ignition injection lapses due to the sufficient exhaust-gas fraction, as is clear from the illustration in FIG. 2.

Inlet opening EÖ is fixed for the point of shortfall of the ambient pressure $P_u$ in the combustion space 3. This prevents a re-expansion of exhaust gas into the intake tract and consequently a cooling of the exhaust gas. The point of inlet opening EÖ and, consequently, the deficiencies of the fresh charge capable of being sucked in and the engine load ML which is possible as a result depend on the point of outlet closing AS and on the quantity and injection point of ignition injection ZE. FIG. 3 therefore indicates, for outlet closing AS and inlet opening EÖ, a region where it is possible to adjust the engine load ML. The intake phase b and main injection HE commence with inlet opening EÖ. The intake phase b extends until inlet closing ES. This occurs when the ambient pressure $P_u$ in the combustion space 3 is exceeded in the region of the first bottom dead centre 1UT. Main injection HE extends beyond this point, depending on the engine load ML. Due to the advanced main injection HE, an intensive mixing of the main fuel with the fresh charge and retained exhaust gas gives rise to a homogeneous lean air/exhaust-gas/fuel mixture.

This is compressed, starting from the compression phase c commencing at inlet closing ES. In this case, the temperature of the homogeneous lean mixture rises to the ignition point of the latter. This is just before ignition dead centre ZOT. Its position is controlled by the quantity and injection point of the activation fuel and, if appropriate, by a variation in effective compression by means of variable inlet closing.

In the combustion phase d which follows ignition, self-maintaining or even self-accelerating combustion takes place. Since the latter easily leads to knocking combustion in the case of a relatively high engine load ML, simple or sequential after-injection NE into the compression phase c is provided for this operating range. As a result, because of the relatively late fuel injection, the cold evaporation of the fuel gives rise to local mixture cooling with a subsequent ignition delay which results in knock-free combustion.

The combustion phase d is followed by the expansion phase e which is terminated by outlet opening AÖ in the region of the second bottom dead centre 2UT. Outlet opening AÖ may be varied as a function of the engine load ML and of the engine speed in order to achieve maximum efficiency. The expansion phase e is followed by the expulsion phase f terminated by the variable outlet closing AS which at the same time initiates the next work cycle.

A control loop which takes into account unintended fluctuations of engine speed and engine load ML stabilizes the ignition point and the profile of main combustion by means of the quantity and injection point of the activation fuel. In this case, the control loop minimizes the quantity of activation fuel and limits the total fuel quantity to the stoichiometric value. A functionally reliable method for operating an internal combustion engine with low fuel consumption and low pollutant emission is achieved in this way.

An alternative to the use of chemical activation is afforded by the control of the ignition point by means of the position of the injection point of main injection into the still retained exhaust-gas quantity, in the case of sufficient volume, before the opening of the inlet members.

I claim:

1. A method for operating a four-stroke reciprocating-piston internal combustion engine with a homogeneous lean basic mixture of air, fuel and retained exhaust gas and with compression ignition and direct fuel injection into a combustion space, a volume of which changes cyclically and which is capable of being filled with fresh gas through at least one inlet member, and combustion exhaust gases being capable of being expelled at least partially out of the combustion space through at least one outlet member, comprising the steps of compressing and subsequently expanding, in an activation phase of a work cycle, the retained exhaust gas in a region of gas-exchange dead center and, in a phase of the work cycle including the activation phase, injecting activation fuel into the combustion space in order to stabilize main combustion.

2. The method according to claim 1, further comprising the step of stabilizing the main combustion by a control loop, taking into account unintentional fluctuations in a speed and load of the internal combustion engine, by means of a quantity and injection point of the activation fuel.

3. The method according to claim 2, wherein the control loop minimizes the quantity of activation fuel and limits a total fuel quantity to a stoichiometric value.

4. The method according to claim 2, wherein the control loop influences an ignition point and a profile of main combustion by means of the injection point and quantity of injection of the activation fuel.

5. The method according to claim 1, wherein, in a case of a low engine load and low engine speed and when the internal combustion engine is running cold, the activation fuel is injected at a commencement of the compression of the retained exhaust gas, but, with an increase in engine load and engine speed and with a rising engine temperature, the activation fuel is injected later and, beyond a specific engine load and engine speed and when the internal combustion engine is running hot, is omitted.

6. The method according to claim 1, wherein the activation fuel is distributed homogeneously in the retained exhaust gas.

7. The method according to claim 1, wherein an ignition point is controlled by means of a position of an injection point of main fuel injection into a still retained exhaust-gas quantity, in a case of sufficient volume, before opening of the at least one inlet member.

8. The method according to claim 1, wherein a commencement of the compression of the retained exhaust gas is determined by a closing point of the at least one outlet member and a termination of the expansion of the retained exhaust gas is determined by an opening point of the at least one inlet member.

9. The method according to claim 8, wherein the at least one inlet member is opened only after a pressure in the combustion space has fallen short of an ambient pressure.

10. The method according to claim 1, wherein an effective compression of the retained exhaust gas depends on a quantity of the retained exhaust gas and is below a maximum geometric compression.

* * * * *